US007903601B2

(12) United States Patent
Voglewede et al.

(10) Patent No.: US 7,903,601 B2
(45) Date of Patent: Mar. 8, 2011

(54) ASYNCHRONOUS DYNAMIC NETWORK DISCOVERY FOR LOW POWER SYSTEMS

(75) Inventors: Paul Voglewede, N. Chili, NY (US);
Scott J. Cloutier, Fairport, NY (US);
Todd W. Joslin, Rochester, NY (US);
Peter J. Roth, Rochester, NY (US);
Adam R. Kent, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 691 days.

(21) Appl. No.: 11/937,015

(22) Filed: Nov. 8, 2007

(65) Prior Publication Data

US 2009/0122781 A1    May 14, 2009

(51) Int. Cl.
*H04B 7/212*    (2006.01)
*H04J 3/06*    (2006.01)
*H04L 12/28*    (2006.01)

(52) U.S. Cl. ......... 370/324; 370/350; 370/390; 370/507; 370/509

(58) Field of Classification Search ........................ None
See application file for complete search history.

(56) References Cited

U.S. PATENT DOCUMENTS

| 6,236,850 | B1 * | 5/2001 | Desai | 455/343.2 |
| 7,573,914 | B2 * | 8/2009 | Ilnicki et al. | 370/519 |
| 2002/0163932 | A1 * | 11/2002 | Fischer et al. | 370/465 |
| 2005/0058081 | A1 * | 3/2005 | Elliott | 370/252 |
| 2006/0083265 | A1 * | 4/2006 | Jordan et al. | 370/503 |

FOREIGN PATENT DOCUMENTS

| EP | 1 601 124 | 11/2005 |
| WO | WO-03086003 | 10/2003 |

OTHER PUBLICATIONS

Xu, C., et al., "Time Synchronization Simulator and Its Application", Industrial Electronics and Applications, 2006 1st IEEE Conference on, IEEE, PI, May 1, 2006, pp. 1-6, XP031026715, ISBN: 978-0-7803-9513-8.
Sivrikaya, F., et al. "Time Synchronization in Sensor Networks: A Survey" IEEE Network, IEEE Service Center, New York, NY US, vol. 18, No. 4, Jul. 1, 2004, pp. 45-50, XP001220892; ISSN: 0890-8044.

* cited by examiner

*Primary Examiner* — Seema S Rao
*Assistant Examiner* — Christine Duong
(74) *Attorney, Agent, or Firm* — Fox Rothschild, LLP; Robert J. Sacco

(57) ABSTRACT

An ad hoc method is provided for synchronizing a wireless network. The method involves broadcasting a first signal including a join message from a first node (FN). The method also involves saving a first timestamps in a memory device internal to the FN after broadcasting the first signal. The method further involves generating a signal including a join response message after receiving the first signal. The join response message is comprised of a second timestamp indicating a local time during which the first signal was received at the second node (SN). The method also includes the step of determining an initial time offset by computing a difference between the first timestamp and the second timestamp. The method further includes the steps of generating a request to send (RTS) message at the FN. The FN uses the initial time offset in conjunction with the RTS message to asynchronously communicate with the SN.

17 Claims, 12 Drawing Sheets

US 7,903,601 B2

ASYNCHRONOUS DYNAMIC NETWORK DISCOVERY FOR LOW POWER SYSTEMS

BACKGROUND OF THE INVENTION

1. Statement of the Technical Field

The invention concerns low power wireless networks. More particularly, the invention relates to a method for the detection of wireless network nodes existing within a communications range, determining routes between the discovered nodes, and a method for synchronizing the timing of communications between two (2) discovered nodes.

2. Description of the Related Art

There are many low power, wireless networks known in the art. Such wireless networks include, but are not limited to, a beaconed synchronized network, a non-beaconed synchronized network and a global positioning system (GPS) synchronized network. Each type of network synchronization includes two or more nodes. The term "node" as used herein refers to a device configured to establish a connection to another device in a wireless network. Such devices often include servers, handheld communications devices, mounted communications devices, sensor devices, relay devices, coordination devices, satellites and the like.

In a beaconed synchronized network, a coordination device is a node configured to synchronize the timing of communications between nodes of the beaconed synchronized network. The term "synchronize" as used herein refers to the coordination of transmit (Tx) and receive (Rx) events so that two or more nodes can operate in sync. This synchronization of events is achieved by the transmission of beacon signals. Each beacon signal provides a timing reference for use by a receiving device to coordinate transmissions. The beacon signals can include information indicating a period of time in which the coordination device will be listening for a receive signal. Alternatively, the beacon signals can define transmit times and receive times. The beacon signals are not addressed to any particular device.

The coordination device periodically transmits such beacon signals at known intervals. Since the beacon signals are not addressed to any particular device, the beacon signals are broadcast to every device that is listening. A device that is synchronized to a coordinator's beacon signal will turn on its receiver at the time a beacon signal is expected to be received. Upon receipt of a beacon signal, the device is synchronized and may perform actions such as transmitting a signal.

Despite the advantages of such a beaconed synchronized network, it suffers from certain drawbacks. For example, the coordination device utilizes a large amount of power. The coordination device also provides a wireless network having a high probability of detection feature. The high probability of detection feature is a result of the frequent beacon signal transmissions.

In a non-beaconed synchronized network, each node is configured to perform actions for synchronizing the timing of communications between nodes in the non-beaconed network. This time synchronization is achieved through the use of message preambles. The phrase "message preamble" as used herein refers to a header portion of a packet that precedes a message. The header may include information relating to address groups, routing indicators, passwords, timing and the like. More particularly, each transmitting device sends a preamble with every message transmission. Upon receipt of a preamble, the receiver performs actions to align its time base with the time base of the transmitting device.

Despite the advantages of such a non-beaconed synchronized network, it also suffers from certain drawbacks. For example, the transmitting and receiving devices utilize a large amount of power during the time synchronization process. The synchronization process occurs during every transmission. Also, time alignment does not occur until a preamble is received at a receiving device.

In a GPS synchronized network, the GPS satellite system provides the synchronization signal. More particularly, the satellites periodically transmit precise GPS signals to GPS receivers at regular intervals. The GPS signals include information for enabling a determination of a GPS receiver's location, a GPS receiver's traveling speed, a GPS receiver's traveling direction and a present time.

Despite the advantages of such a GPS synchronized network, it also suffers from certain drawbacks. The GPS synchronized network is somewhat unreliable. For example, if a GPS receiver is located in a cave or dense vegetation, then the GPS receiver is unable to receive a GPS signal. As a result, an internal clock of the GPS receiver becomes unsynchronized.

In view of the forgoing, there is a need for a wireless network having a low power consumption feature and a low probability of detection feature. More particularly, there is a need for a synchronization method that requires less signal transmissions as compared to a beaconed synchronized network and a GPS synchronized network. There is also a need for a synchronization method that can provide a network device having a low power consumption feature. There is further a need for a synchronization method that is more reliable than a GPS based synchronization method.

SUMMARY OF THE INVENTION

A method for synchronizing a wireless network is provided. The method involves broadcasting a first signal including a join message from a first node and saving a first timestamp in a memory device internal to the first node corresponding to a broadcast time of the first signal. The method also involves generating at a second node a second signal including a join response message after receiving the first signal. The join response message is comprised of a second timestamp indicating a local time during which the first signal was received at the second node. The method further involves determining an initial time offset by computing a difference between the first timestamp and the second timestamp. The initial time offset is used to synchronize a timing of a subsequent communication between the first node and the second node.

According to an aspect of the invention, the method includes the step of defining a first epoch at the first node to include a first continually repeated timing cycle at the first node. The method also includes the step of defining a second epoch at the second node to include a second continually repeated timing cycle at the second node. The method further includes the step of selecting the first timestamp to be a value representing the duration of time between a beginning of the first epoch and a time when the first signal including the join message is broadcasted.

According to another aspect of the invention, the method includes the step of operating the first node and the second node so that the first epoch and the second epoch are asynchronous. The method also includes the step of selecting the second timestamp to be a value representing the duration of time between a beginning of the second epoch and a time when the first signal including the join message is received at the second node. The time offset represents a difference in a start time of the first epoch and the second epoch. The method further includes the step of selectively activating an RF receiver in the second node in accordance with a predetermined duty cycle to cause the RF receiver activation during a period of time that is less than a duration of the second epoch.

According to another aspect of the invention, the method includes the step of generating at least one request to send (RTS) message at the first node to initiate a data communication with the second node. Notably, a time stamp is generated when each RTS message is transmitted to the second node. The time stamp represents the duration of time from a beginning of the first epoch to a time when the RTS message is transmitted. The method also includes the step of generating a clear to send (CTS) message at the second node to acknowledge the RTS message. The CTS message includes a time stamp identifying when the RTS message was received at the second node relative to a beginning of the second epoch. The CTS message is processed at the first node to update the value of the initial time offset to obtain an updated time offset value. The method further includes the step of selectively communicating a data message from the first node to the second node exclusively during a time corresponding to the RF receiver predetermined duty cycle.

According to yet another aspect of the invention, the method includes the step of periodically updating the time offset value. In such a scenario, a request to send message and a clear to send message are used to send messages to update the time offset value. An RTS time stamp is generated for transmission of the request to send message. Similarly, a CTS time stamp is generated for receipt of the request to send message. The updated value of the time offset is calculated using the RTS time stamp and the CTS time stamp.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The present invention relates to a wireless network absent of a global arbitration node. The phrase "global arbitration node" as used herein refers to a central device that transmits synchronized timing pulses to other nodes in a network. The wireless network is configured to have a low power consumption feature and a low probability of detection feature. The present invention also concerns an efficient and reliable method for the detection of the low power wireless network by discovering nodes existing within a communications range and determining routes between the discovered nodes. The method is also provided for synchronizing the timing of communications between the nodes in the wireless network without utilizing GPS signals.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system or a computer program product. Accordingly, the present invention can take the form as an entirely hardware embodiment, an entirely software embodiment or a hardware/software embodiment.

Figure 1:
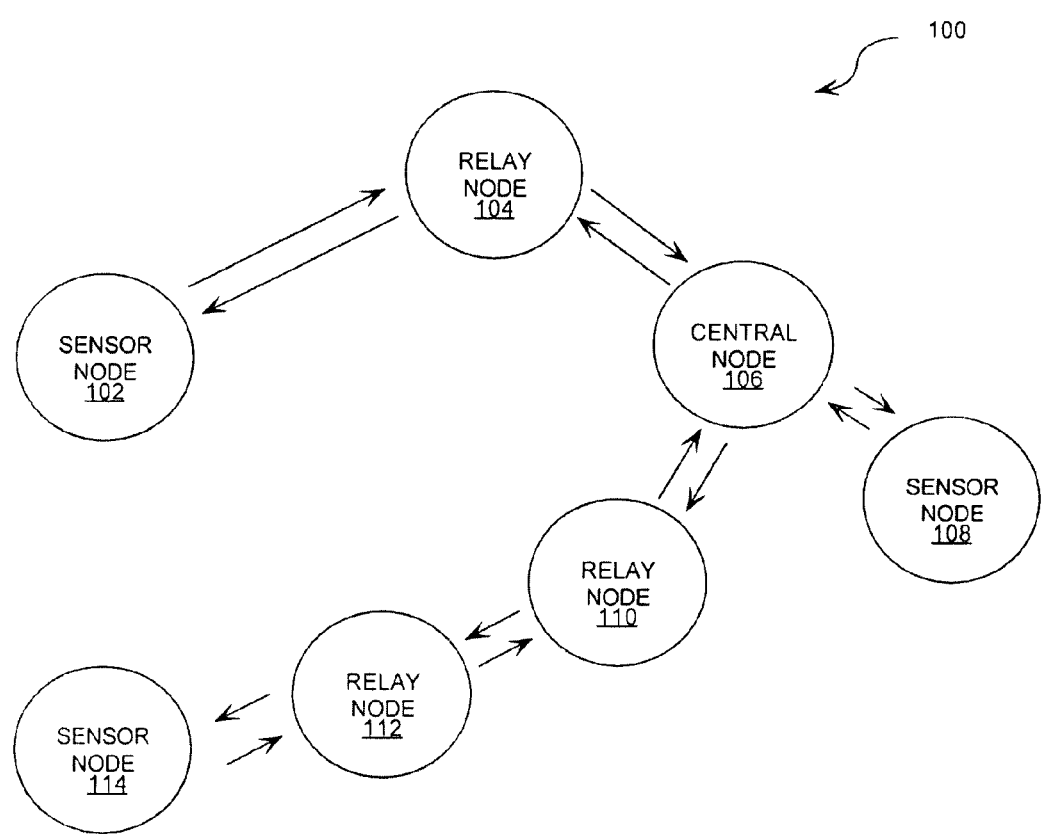
FIG. 1 is a block diagram of a low power, wireless network that is useful for understanding the present invention.

Referring now to FIG. 1, there is provided a block diagram of a low power, wireless network 100 that is useful for understanding the present invention. The wireless network 100 is comprised of two or more nodes. Three basic types of nodes are included in the network. Specifically, the network includes sensor nodes 102, 108, 114, relay nodes 104, 110, 112, and a central node 106. Sensor nodes 102, 108, 114 are positioned at remote locations in the field for detecting various types of activity. The central node 106 is typically located at a base location for monitoring the activity reported by the sensor nodes 102, 108, 114. The relay nodes 104, 110, 112 are located between the sensor nodes 102, 108, 114 and the central node 106 for relaying data communications from the sensor nodes 102, 108, 114 to the central node 106.

Each sensor node 102, 108, 114 can be an intrusion detection device configured to perform physical observations. Thus, each sensor node 102, 108, 114 can include a geophone, a magnetometer, a passive inferred detector and/or the like. In order to conserve power, sensor nodes 102, 108, 114 will generally deactivate their receiver circuitry except during periods of time when transmissions from other nodes are expected. More particularly, a sensor node 102, 108, 114 will not generally turn on its receiver except for those periods following one of the sensor node's transmissions that is intended to elicit a response from another node. Sensor nodes 102, 108, 114 will also deactivate their transmit circuitry except for periods of time when they are attempting to join the network, synchronize timing, or communicate a notification. These processes are described in more detail in relation to the network initialization descriptions provided below.

Relay nodes 104, 110, 112 operate somewhat differently as compared to sensor nodes 102, 108, 114. The relay nodes 104, 110, 112 operate in accordance with a timing cycle or epoch, which is continually repeated at each relay node. During a portion of each timing cycle, the relay nodes 104, 110, 112 will automatically activate their receiver circuitry. For example, the epoch or timing cycle can be a total of five seconds in duration, and the receiver circuitry can be active or turned on during one (1) second out of the total five second duration. The epoch or timing cycle is repeated continuously at each node so that the receiver is periodically activated for receiving signals.

The invention is not limited with regard to the duration of the timing cycle or the duration of receiver activation time. These times can be adjusted in accordance with a particular system design. However, such relay node receiver activation preferably has a relatively low duty cycle, such that the receiver is off most of the time. During those time periods when the receiver is active, the relay node 104, 110, 112 will actively listen for communications from other nodes that are attempting to join the network and will actively listen for request-to-send (RTS) notifications from other nodes, which indicate that such other nodes are seeking to send a data transmission to the relay node 104, 110, 112. These various types of communications are discussed in greater detail below.

Notably, it is advantageous to have the duty cycle for receiver activation in each node be as low as reasonably possible for purposes of conserving battery power. For example, in an embodiment of the invention, the receiver duty cycles can be ten percent (10%) or less. A ten percent (10%) receiver duty cycle means that a receiver is operational (i.e. turned on) only ten percent (10%) of any time period during which the node is otherwise active. Tradeoffs between system timing accuracy, power consumption and system throughput delay must be taken into consideration when determining the duty cycle.

The timing cycle or epoch of each relay node is not synchronized with the other nodes in the network. Accordingly, each relay node of the wireless network 100 will activate it's receiver during an arbitrary period of time in accordance with the timing cycle of that relay node. As such, it is important that each relay node of the wireless network 100 communicates to the other nodes in the wireless network 100 information indicating when its receiver will be active. Communication of synchronization information occurs during a join attempt, i.e., when the node is attempting to join the network. Upon receipt of such a communication, a receiving node will use the information to synchronize communications between itself and the respective node.

Central nodes 106 function differently as compared to sensor nodes 102, 108, 114 and relay nodes 104, 110, 112. A central node 106 will generally include a computer processing system executing a sensor management application and configured to receive sensor information. For example, the computer processing system is advantageously configured to process the sensor information to determine if a vehicle, animal, person or object present within a particular geographic area is an intruder. The computer processing system is coupled to a wireless transceiver. The central node 106 will generally be located at a base facility. Accordingly, power conservation is of considerably less concern for the central node 106 as compared to the sensor nodes 102, 108, 114 and relay nodes 104, 110, 112 which are remotely located in the field. In view of the foregoing, it is anticipated that the receiver circuitry for the central node 106 will operate continuously (100% duty cycle). Still, the invention is not limited in this regard and the receiver circuitry at the central node 106 can operate at less than a one hundred percent (100%) duty cycle.

When a network is to be established, sensor nodes, relay nodes and a central node 102, . . . , 114 can be positioned by a technician. The sensor nodes 102, 114, 108 are typically positioned around a perimeter or at selected locations to be monitored. Relay nodes 104, 112 are positioned as necessary to facilitate data communications from the sensor nodes 102, 108, 114 to the central node 106. In this regard, it should be noted that each sensor node, relay node and central node 102, . . . , 114 is located a certain distance from another node. The distance is selected in accordance with a particular wireless network application. For example, if each node 102, . . . , 114 has a maximum connection distance of five (5) miles, then a sensor node 102 is preferably placed at a location that is less than five (5) miles from the relay node 104. Similarly, the relay node 104 is preferably placed at a location that is less than five (5) miles from the central node 106, and so on. Still, it will be appreciated by those skilled in the art that the maximum actual distance between nodes will depend on the communication range capability of each node. For example, for communications between nodes up to 5 miles apart, a VHF or UHF frequency band can be selected. Still, it should be understood that the invention can be used for wireless network communications at any frequency.

Nodes 102, . . . , 114 advantageously communicate with one another using a defined communication protocol. For example, the defined communication protocol can be selected to include an internet protocol (IP) based communication method. IP communication protocols are well known in the art, and therefore will not be described here in detail. However, it will be appreciated that in a wireless computer network, communications protocols are commonly implemented using the International Standards Organization (ISO) Model for Open Systems Interconnection (OSI). This international standard is sometimes referred to as the OSI reference model. The OSI protocol can be used for implementing the various communications between nodes 102, . . . , 114 in FIG. 1 as shall be hereinafter described.

Figure 2A:
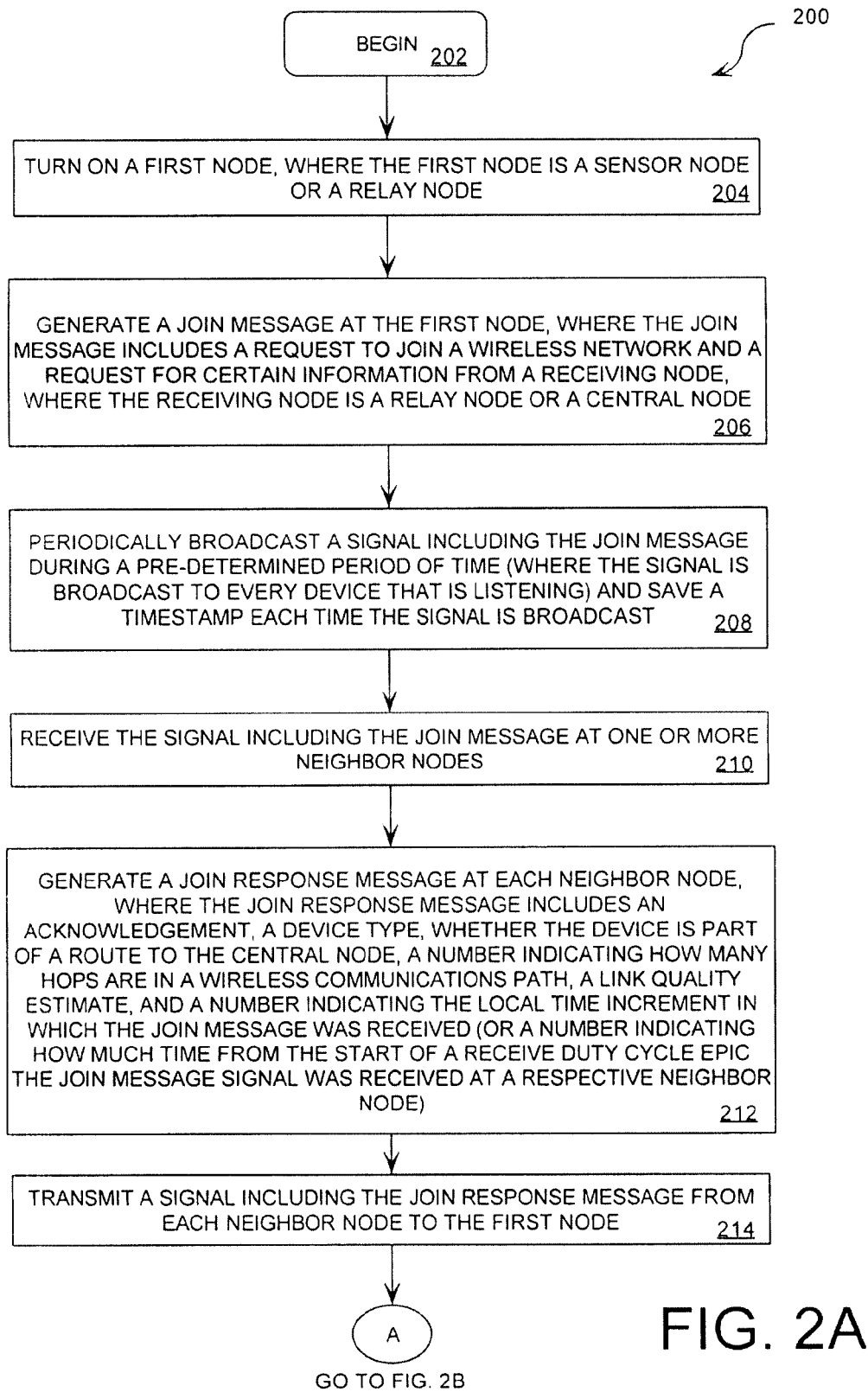
FIGS. 2A-2B collectively provide a flow diagram of a method for (a) the detection of the low power wireless network by discovering nodes existing within a communications range, (b) determining routes between discovered nodes, and (c) synchronizing the timing of communications between two nodes of the same or different type.

Referring now to FIG. 2, there is provided a method 200 for (a) the detection of the low power wireless network by discovering nodes 102, . . . , 112 existing within a communications range, (b) determining routes between the discovered nodes 102, . . . , 112, and (c) synchronizing the timing of communications between two (2) nodes 102, . . . , 112 of the same or different type. In this regard, it should be understood that the method 200 can be performed to synchronize the timing of communications between (a) a sensor node 102, 108, 114 and a relay node 104, 110, 112, (b) a sensor node 102, 108, 114 and a central node, 106 (c) a relay node 104, 110, 112 and a relay node 104, 110, 112, or (d) a relay node 104, 110, 112 and a central node 106. Still, the invention is not limited in this regard.

As shown in FIG. 2, the method 200 begins at step 202 and continues with step 204. In step 204, a first node is powered (or turned) on. The first node can be a sensor node 102, 108, 114 or a relay node 104, 110, 112. After step 204, step 206 is performed where a join message is generated at the first node. The join message includes a request to join a wireless network 100 and a request for certain information from a receiving node.

Subsequent to the completion of step 206, the method 200 continues with step 208. In step 208, the first node periodically transmits a signal including the join message during a pre-determined period of time. The join messages are transmitted without knowledge of any other node's receiver activation period. In order to guarantee that the join messages are received by other nodes, multiple join messages are transmitted for a period of time. The period of time is advantageously selected to be more than one epoch in duration and at a frequency that ensures any node receiver on cycle will be hit with multiple join messages. For example, the period of time during which the join messages are transmitted can be 2 epochs in duration. The foregoing process is one join cycle. The join message is not addressed to any particular node.

Therefore, the join message can be received by any node that has its receiver turned on during the time of transmission. However, each join message contains an identification number which is sufficient to distinguish each join message from every other join message in a join cycle.

Step 208 also involves saving a timestamp in an internal memory (not shown) each time a join message is broadcast. The timestamp is the duration of time from the start of the epoch to the start of each particular join message transmission. In this regard, it can be advantageous to divide the epoch into a plurality of smaller time increments. The number of time increments contained within an epoch can be selected for a particular system to provide a sufficient timing resolution. A greater number of time increments will generally provide greater timing resolution. For example, a five second epoch can be divided into 100 time increments, where each increment is 50 milliseconds in length. The timestamp provides a measure of when each join message is sent relative to a start of an epoch, by identifying a number of elapsed time increments. This timestamp is used in a later step to calculate the start of the epoch of any node response to any join message.

Thereafter, the method 200 continues with step 210. In step 210, the join message is received at one or more neighbor nodes. The phrase "neighbor node" as used herein refers to a node that is or can be directly connected to the first node via a communications link. In step 212, each neighbor node which has received the join message transmitted in step 210 will generate a join response message. The join response message includes an acknowledgement to the join message, including an identification number or designation of the particular join message that was received by the neighbor node. The join response message also includes information identifying the device type of the neighbor node. Such device types will generally only include relay nodes 104, 110, 112 and central nodes 106, since sensor nodes 102, 108, 114 are not designed to respond to such join messages. However, the ability for sensor nodes 102, 108, 114 to respond to a join message is not a necessary limitation. As noted above, the receiver circuitry in a sensor node 102, 108, 114 generally remains deactivated until a transmission is specifically expected in response to a communication generated by that particular sensor node. The join response message further includes information indicating whether the neighbor node is part of a route to a central node 106, information indicating how many hops are in a wireless communications path to the central node, and information indicating a link quality estimate.

The join response message also includes information indicating a particular time increment in an epoch of a neighbor node during which the join message was received at the neighbor node. The time increment identifies the amount of time that has elapsed from a start of a epoch at the neighbor node until the join message signal was received at the neighbor node. Notably, this timing information is used by the first node in step 228 of FIG. 2B to compute time offsets. The first node synchronizes the timing of communications between itself and a neighbor node utilizing the computed time offsets. This synchronization process will become more evident as the discussion progresses.

Referring again to FIG. 2A, the method continues with step 214. In step 214, each neighbor node which has received the join message transmitted in step 210 transmits a signal to the first node. The signal includes the join response message. Subsequent to step 214, the method continues with a decision step 216 of FIG. 2B. In step 216 of FIG. 2B, a determination is made as to whether or not the first node has received a signal including a join response message. If the first node has not received such a signal [216:NO], the method 200 continues to step 218. In step 218, the first node waits a pre-determined period of time. This period is selected in accordance with a particular first node application. For example, the period of time can be selected as five (5) minutes, one (1) hour, two (2) hours, eight (8) hours and ten (10) hours. In such a scenario, if step 218 is being performed for the first time, then the period of time is selected to be five (5) minutes. Alternatively, if step 218 is being performed for the second time, then the period of time is selected to be one (1) hour, and so on. Still, the invention is not limited in this regard. After waiting the pre-determined period of time in step 218, the method 200 returns to step 206 of FIG. 2A.

The purpose for the waiting period in step 218 is to conserve power. If, in step 216, the first node has not received a signal including a join response it can be assumed that there are no nodes presently available to generate such a response. Accordingly, the node will wait for progressively longer periods of time before repetitively transmitting another join message. These periods allow sufficient time for a technician to place or otherwise activate neighbor nodes in additional locations as may be necessary for a particular application.

If the first node has received a join response message [216:YES], then the method 200 continues to step 222. In step 222, the first node performs actions to process each join response message to obtain information contained therein. Thereafter, in step 224, the first node builds a network table by storing the information obtained from each join response message. The network table is stored in a memory device (not shown) of the first node. Subsequent to building the network table, the first node performs actions to determine which of its local time increment corresponds to a time increment zero (T=0) of a neighbor node. This determination is made for each neighbor node which has responded to a join message.

In step 228, the first node determines a time offset associated with a transmit (Tx) event (i.e., the time when the join message was transmitted) and receive (Rx) events (i.e., the time when the join message was received at a neighbor node) of the neighbor nodes. A time offset is determined by calculating a time difference between the local time increment identified in step 226 and the time zero (T=0) of a respective neighbor node. This calculation will be described below in relation to FIG. 3. After step 228, the method 200 continues with step 230. In step 230, the first node performs actions to build a time offset table. The time offset table is built by storing the results of the calculations in a memory device (not shown) of the first node. The results are stored in a table format. Still, the invention is not limited in this regard. For example, the results can alternatively be stored in the network table as opposed to a separate time offset table. After completing step 230, the method 200 continues to step 218.

Figure 2B:
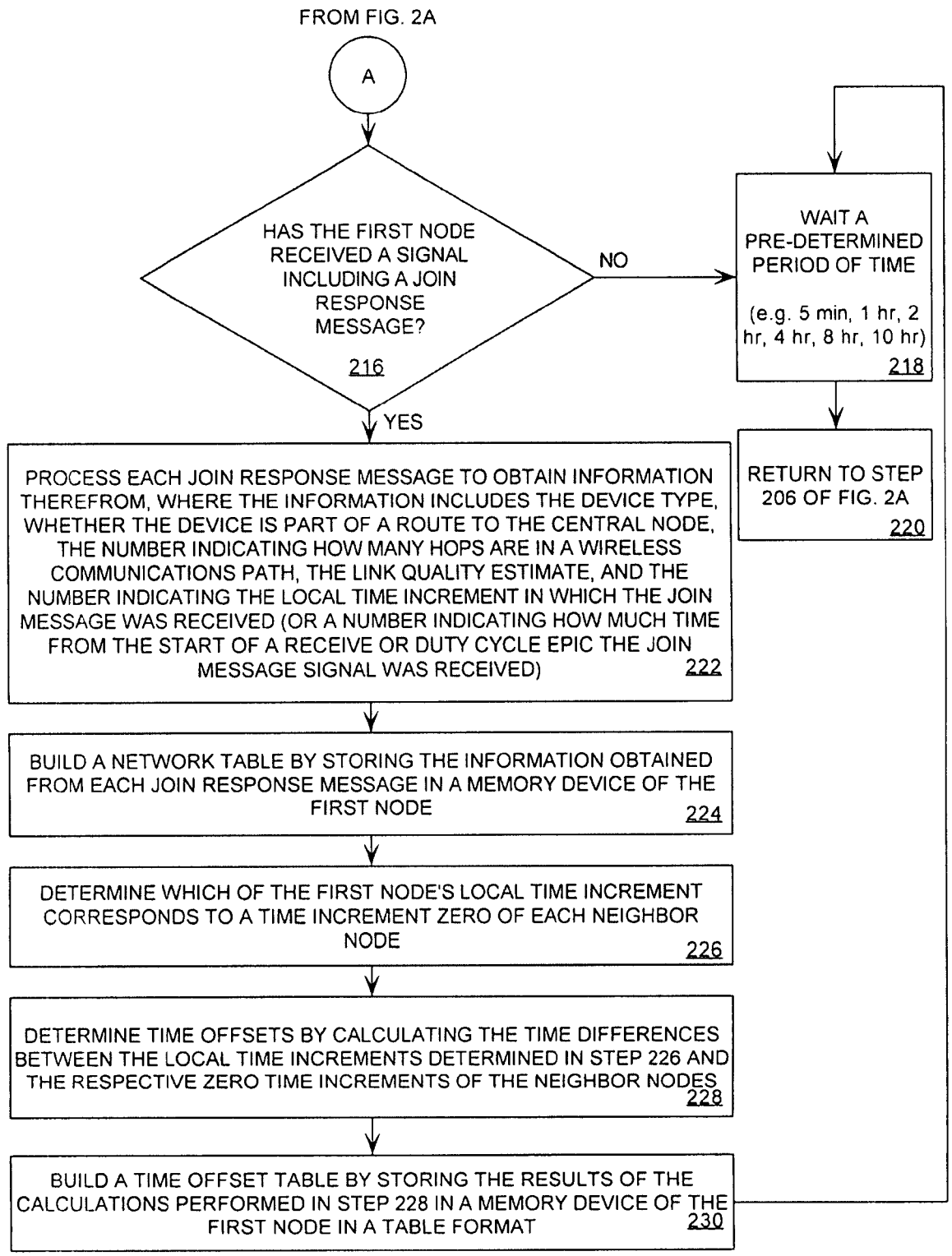
Figure 3A:
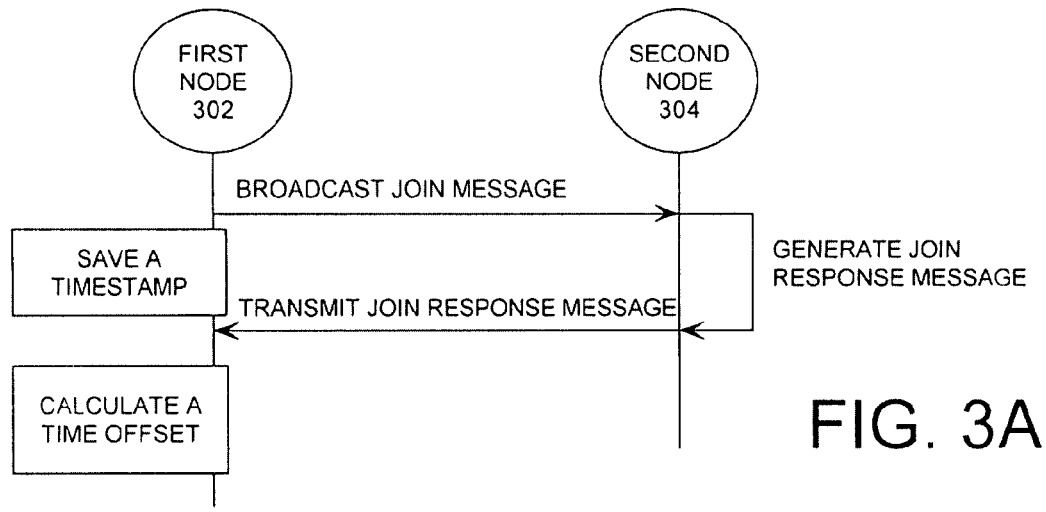
FIG. 3A is a sequence diagram for a communication between a first and second node that is useful for understanding the invention.

Referring now to FIG. 3A, there is provided a state diagram of communications between two nodes that is useful for understanding the time offset computations performed in step 228 of FIG. 2B. A timing diagram that is useful for understanding the time offset computations performed in step 228 is provided in FIG. 3B. The timing diagram shows the timing of join messages transmitted from the first node 302 and received at the second node 304.

Figure 3B:
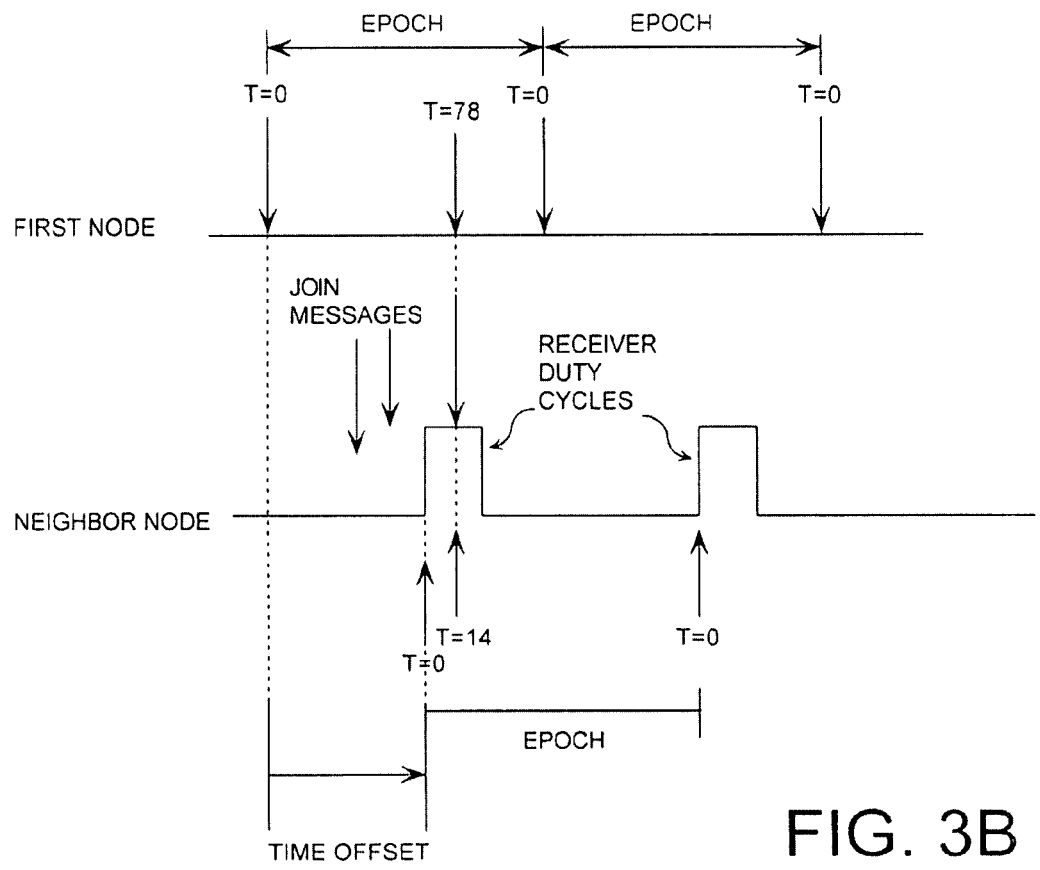
FIG. 3B is a conceptual diagram illustrating a calculation performed in step 228 of FIG. 2B that is useful for understanding the invention.

In the embodiment shown in FIGS. 3A-3B, the first node 302 is selected to be a sensor node. As such, the first node 302 is configured to periodically transmit join messages to the second node 304 during time increments during a period of time comprising at least one epoch. According to an embodiment of the invention, the first node 302 periodically transmits join messages to the second node 304 during each time increment of two (2) epochs. This transmission time configuration ensures that an overlap will occur between the first node's epoch and the second node's duty cycle (or epoch). Still, the invention is not limited in this regard.

The first node 302 is also configured to wait a pre-determined period of time between each of the join message transmissions. During this pre-determined period of time, the first node's 302 receiver is activated so that the first node 302 can receive a join response message transmitted from the second node 304.

FIGS. 3A-3B will now be described in more detail. As shown in FIGS. 3A-3B, the first node 302 transmits a signal including a join message via a broadcast transmission. Broadcast transmissions are well known to those skilled in the art, and therefore will not be described in great detail herein. However, it should be understood that a broadcast transmission generally involves transmitting an internet protocol (IP) packet to an IP subnet broadcast address. In effect, any node with an activated receiver will receive the join message. It should be noted that the join message includes message identification (ID) information, such as a message ID number. This identification information is used by the first node 302 to identify the timestamp associated with the join message received at the second node 304. For each such join message that is transmitted, the first node 302 generates a timestamp indicating when the join message was transmitted. The timestamp advantageously identifies a duration of time that has elapsed subsequent to the start of an epoch or time zero (T=0) associated with the first node. This timestamp and associated identification information is stored in a memory location of a memory device (not shown) that is internal to the first node 302.

When a second (or neighbor) node 304 receives the signal including the join message, it generates a join response message. The join response message includes a timestamp. The timestamp represents a duration of time that has elapsed from the start of an epoch or time zero (T=0) at the second node, up to the time when the join response was received at the second node 304. It should be noted that the join response message includes the identification information that was contained in the join message transmitted from the first node 302. Thereafter, the neighbor node 304 transmits a signal including the join response message to the first node 302.

Subsequent to receiving the join response message, the first node 302 uses the information contained in the join response message. For example, it can use the identification number in the join response message to identify which specific join message caused the join response message to be sent. Using this information, the first node 302 retrieves from memory the time stamp associated with the particular join message that was received at the second node 304. Once the timestamp is determined, the first node 302 performs actions to calculate a time offset from the start of its epoch (i.e., time zero T=0) to the start of the second node's 304 epoch (i.e., time zero T=0). For example, if the first node 302 timestamp has a value of seventy-eight (78) and the join response message includes a timestamp of fourteen (14), then the time offset is computed as follows: 78−14=64 time increments. The computed time offset indicates that there are sixty-four (64) time increments between the start of the first node's 302 epoch and the start of the second node's 304 duty cycle (or epoch).

Referring now to FIGS. 4A-4G, there is provided a schematic illustration of a process for the deployment of nodes in a wireless network, where the nodes implement the method 200 (described above in relation to FIGS. 2A-2B). As shown in FIGS. 4A-4G, the deployment process can include a number of steps in accordance with a particular wireless network configuration.

The deployment process can begin in any order. An example of one particular order is provided in FIG. 4A. As shown in FIG. 4, the deployment process begins by powering (or turning) on one or more sensor nodes 402, 404. Subsequent to being powered on, each sensor node 402, 404 begins its join sequence in accordance with method 200. The join sequence includes (a) generating a join message (step 206) and (b) periodically broadcasting a signal (step 208) including the join message during a pre-determined period of time. If the pre-determined period of time has expired and the sensor nodes 402, 404 have not received a signal including a join response message from a neighbor node 406, then the sensor nodes 402, 404 begin a back-off process (step 218). This back-off process involves waiting a pre-determined period of time (e.g. five minutes, one hour, two hours, four hours, eight hours, or ten hours) before re-starting the join sequence.

Figure 4A:
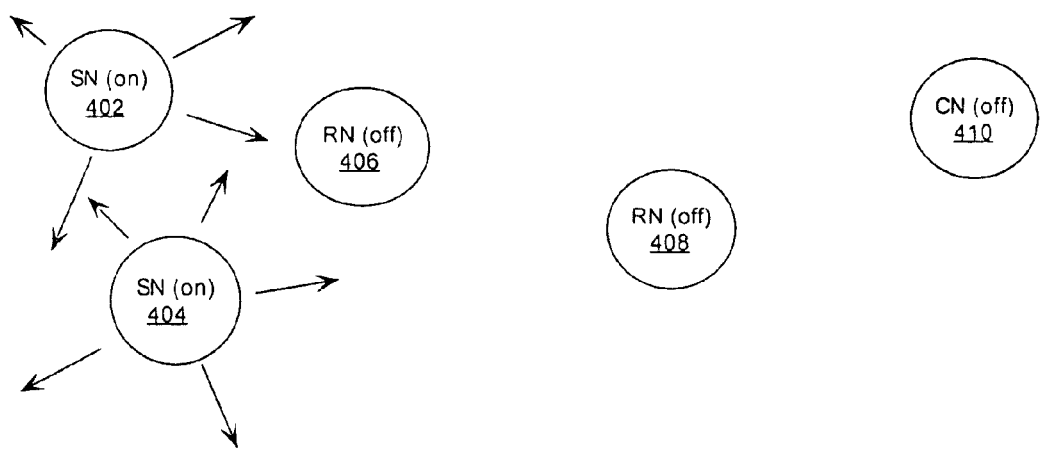
FIGS. 4A-4G collectively provide a schematic illustration of a process for the deployment of nodes in a wireless network, where the nodes implement the method of FIGS. 2A-2B.
Figure 4B:
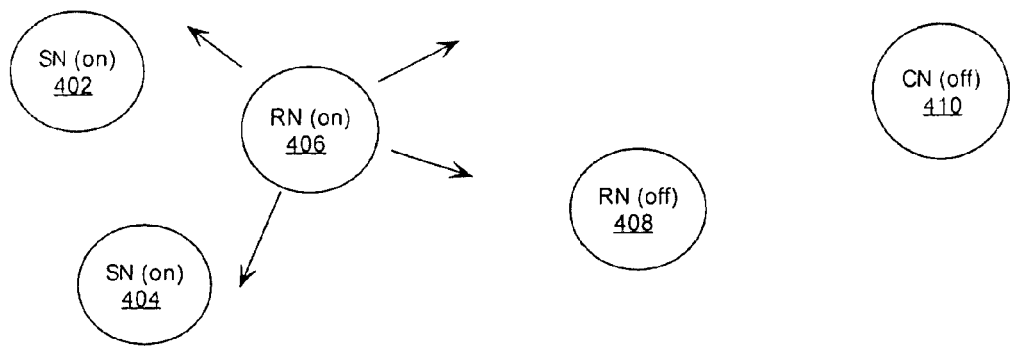

As shown in FIG. 4B, the deployment process continues with actions to power (or turn) on a relay node 406. Subsequent to being powered on, the relay node 406 begins its join sequence in accordance with method 200. The join sequence includes (a) generating a join message (step 206) and (b) periodically broadcasting (step 208) a signal including the join message during a pre-determined period of time. If the pre-determined period of time has expired and the relay node 406 has not received a signal including a join response message from a neighbor node 402, 404, 408, then the relay node 406 begins a back-off process (step 218). This back-off process involves waiting a pre-determined period of time (e.g. five minutes, one hour, two hours, four hours, eight hours, or ten hours) before re-starting its join sequence.

Figure 4C:
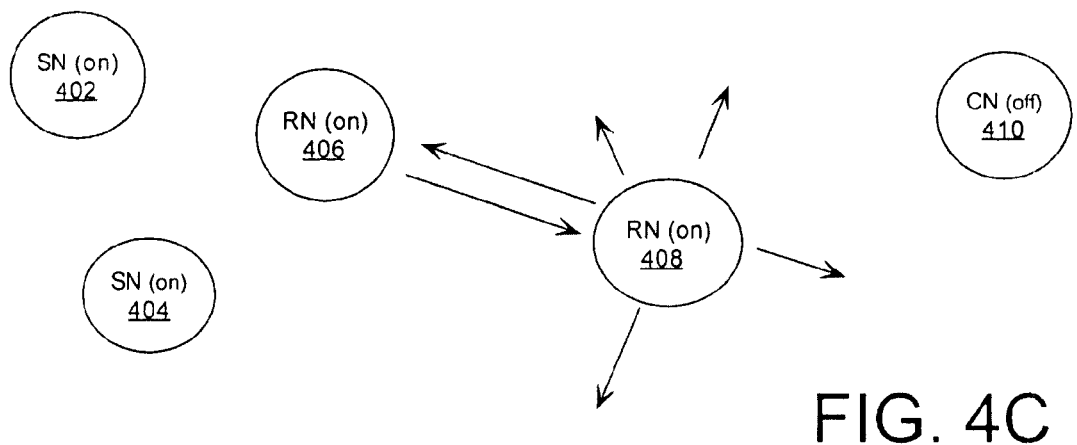

Referring now to FIG. 4C, the deployment process continues with actions to power on a relay node 408. After being powered on, the relay node 408 begins its join sequence in accordance with method 200. More particularly, the relay node 408 periodically broadcasts a signal (step 208) including a join message during a pre-determined time interval. As shown in FIG. 4C, the relay node 406 receives a signal (step 210) including the join message. In turn, the relay node 406 transmits a signal (step 214) including a join response message to the relay node 408. Once the signal is received at the relay node 408, a communication link is established between the relay nodes 406, 408.

Figure 4D:
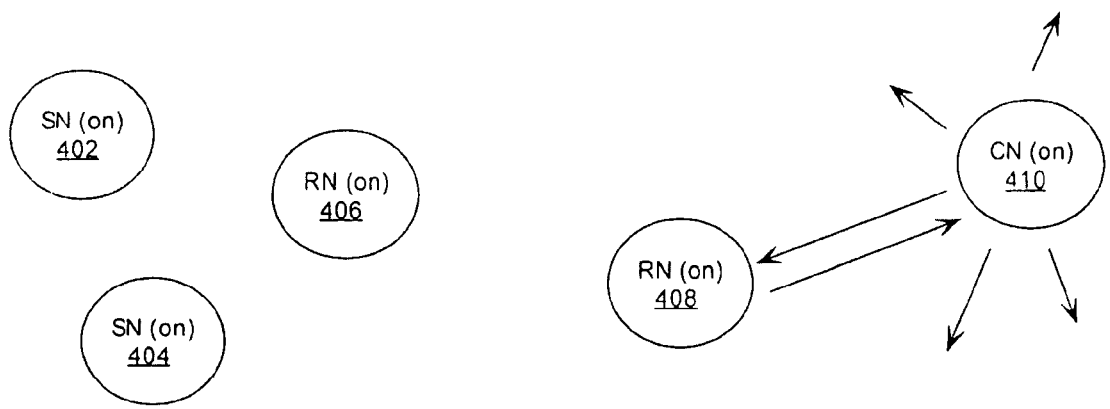

Referring now to FIG. 4D, the deployment process continues with actions to power on a central node 410. Upon being turned on, the central node 410 starts its join sequence in accordance with method 200. The join sequence includes (a) generating a join message (step 206) and (b) periodically broadcasting (step 208) a signal including the join message during a pre-determined period of time. A signal including the join message is received at the relay node 408 (step 210). Upon receipt of the signal, the relay node 408 generates a join response message (step 212) and transmits a signal (step 214) including the join response message to the central node 410. Once the signal is received at the central node 410, a communication link is established between the relay node 408 and the central node 410.

Figure 4E:
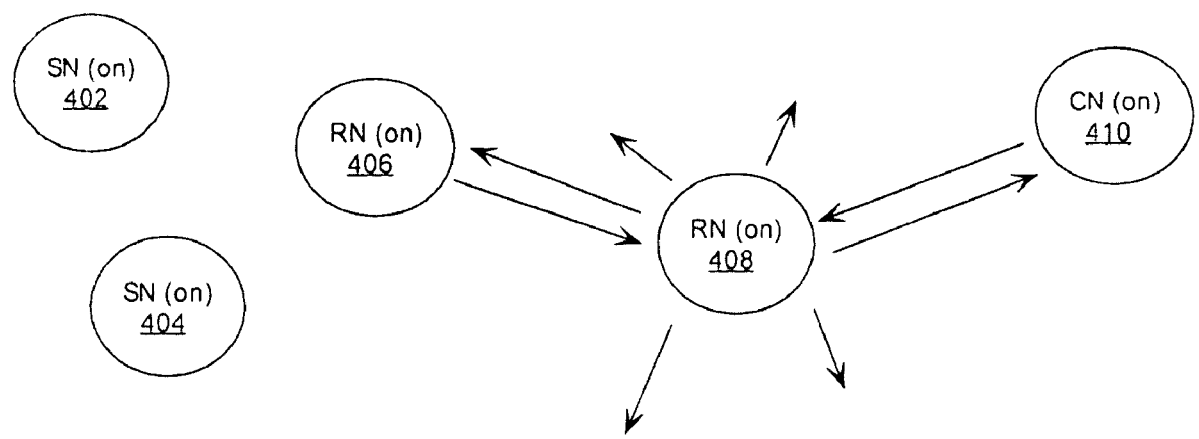

Referring now to FIG. 4E, the relay node 408 performs actions to re-start its join sequence (step 220). More particularly, the relay node 408 generates a join message (step 206) and broadcasts a signal (step 208) including the join message to every device that is listening. The signal (step 210) is received at the relay node 406 and the central node 410. As a result, the relay node 406 generates a join response message (step 212) and transmits a signal (step 214) including the join response message to the relay node 408. When the relay node 408 receives the signal, a communications link is established between the relay nodes 406, 408. The central node 410 also generates a join response message (step 212) and transmits a signal (step 214) including the join response message to the relay node 408. When the relay node 408 receives the signal, a communications link is established between the relay node 408 and the central node 410.

Figure 4F:
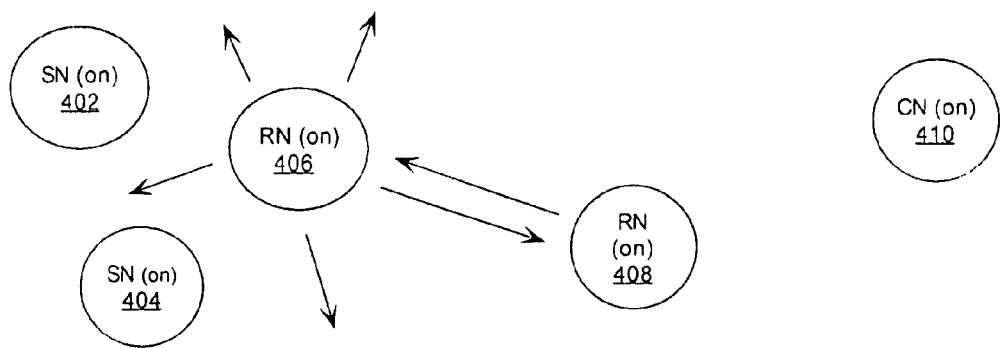

Referring now to FIG. 4F, the relay node 406 performs actions to re-start its join sequence (step 220). More particularly, the relay node 406 generates a join message (step 206) and broadcasts a signal (step 208) including the join message to every device that is listening. The signal (step 210) is received at the relay node 408. As a result, the relay node 408 generates a join response message (step 212) and transmits a signal (step 214) including the join response message to the relay node 408. When the relay node 408 receives the signal, a communication link is established between the relay nodes 406, 408.

Figure 4G:
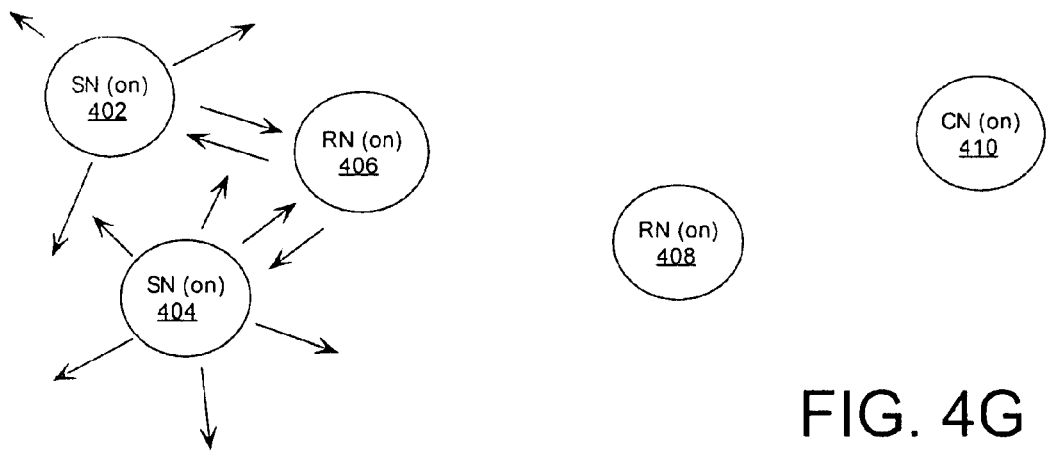

Referring now to FIG. 4G, the sensor nodes 402, 404 perform actions to re-start their join sequences (step 220). More particularly, each of the sensor nodes 402, 404 generates a join message (step 206) and broadcasts a signal (step 208) including the join message to every device that is listening. When the signal is received at the relay node 406, the relay node 406 generates a join response message (step 212). Thereafter, the relay node 406 transmits signals (step 214) including the join response message to the sensor nodes 402, 404. When a sensor node 402, 404 receives a signal, a communications link is established between the sensor node 402, 404 and the relay node 406.

Figure 5A:
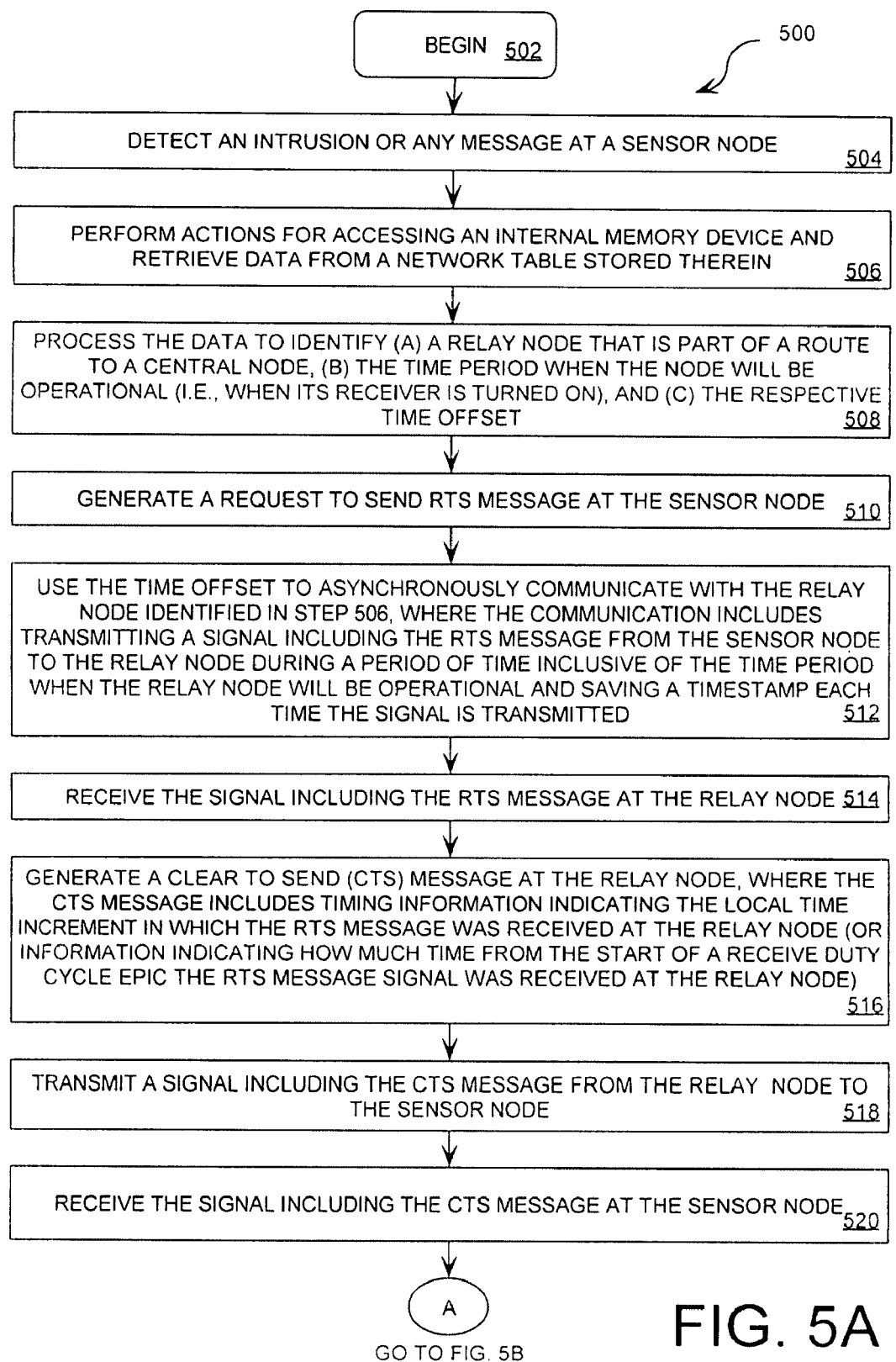
FIGS. 5A-5B collectively provide a flow diagram of a method for (a) communicating an intruder alarm message from a sensor node to a neighbor node and (b) for re-synchronizing the timing of communications between the nodes.
Figure 5B:
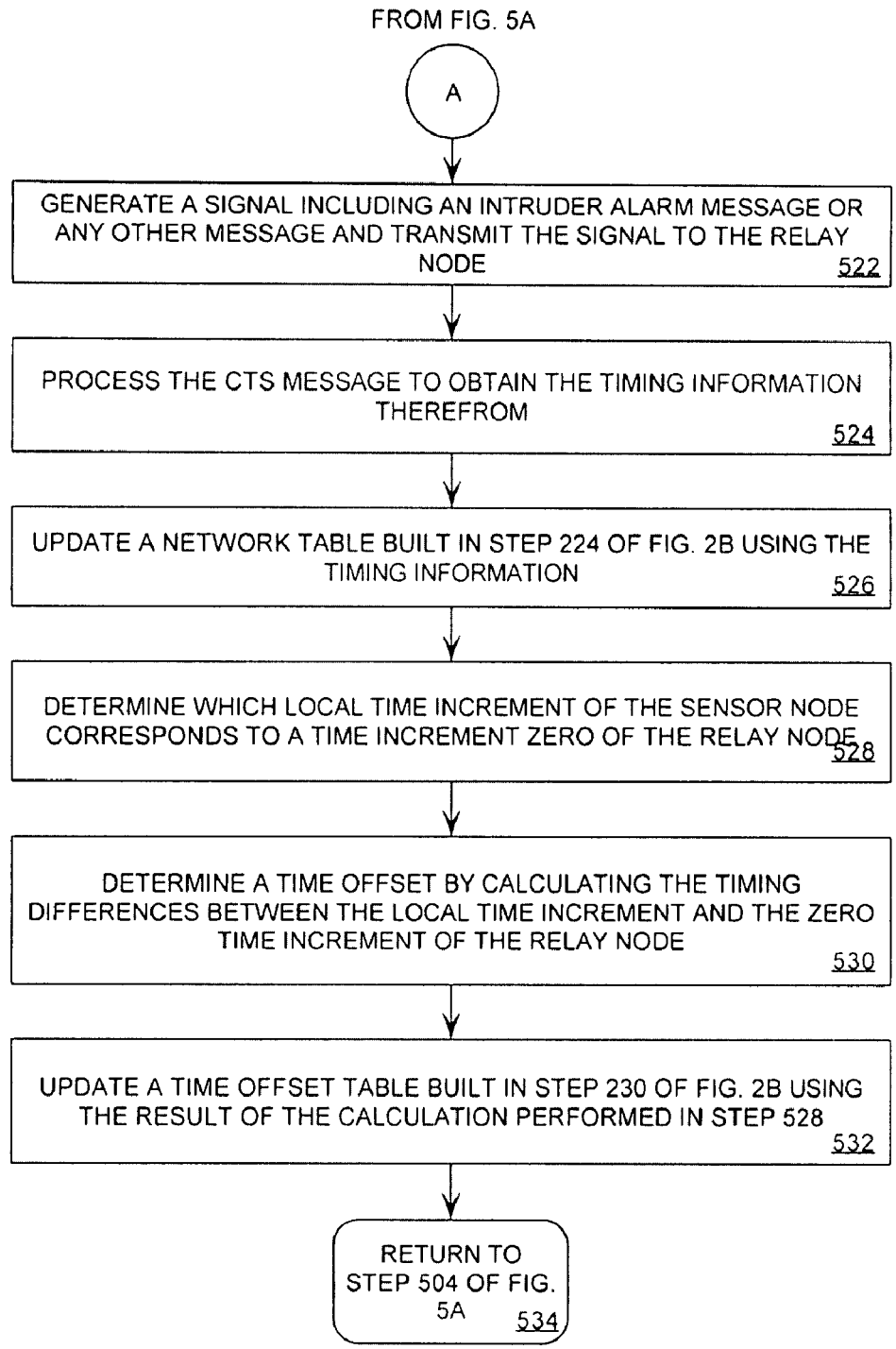

Referring now to FIGS. 5A-5B, there is provided a flow diagram of a method 500 for (a) communicating an intruder alarm message from a sensor node to a neighbor node and (b) re-synchronizing the timing of communications between two nodes. As shown in FIG. 5A, the method 500 begins at step 502 and continues with step 504. In step 504, an intrusion or any message is detected at a sensor node. Thereafter, step 506 is performed where the sensor node performs actions to access an internal memory device (not shown) and retrieve data from a network table stored therein. After step 506, step 508 is performed where the sensor node performs actions to process the data to identify a relay node that is part of a route to a central node. The sensor node also performs actions to process the data to identify a time period when the identified relay node will be operational. The sensor node further processes the data to obtain time offset data therefrom.

Upon completing step 508, the method 500 continues with step 510. In step 510, the sensor node generates a request to send (RTS) message. Thereafter, step 512 is performed where the sensor node uses the time offset data obtained in step 508 to asynchronously communicate with the relay node identified in step 506. In this regard, it should be appreciated that the time offset data indicates a time offset associated with a previous transmit (Tx) event (i.e., the time when a join message was transmitted from the sensor node) and a previous receive (Rx) event (i.e., the time when a join message was received at the relay node). This time offset data provides a means for ensuring that the RTS message is transmitted from the sensor node to the relay node when the relay node's receiver is activated. This communication includes transmitting a signal including the RTS message to the relay node identified in step 508 during a pre-determined period of time. This pre-determined period of time includes the time period when the relay node's receiver is activated. Step 512 also involves saving a timestamp in an internal memory device (not shown) each time the signal is transmitted. Subsequent to step 512, step 514 is performed. This time stamp indicates a number time increments that have elapsed subsequent to the beginning of an epoch at the sensor node. In step 514, the signal including the RTS message is received at the relay node. In step 516, the relay node generates a clear to send (CTS) message. The CTS message includes timing information indicating a local time increment in which the RTS message was received at the relay node. Stated differently, the CTS message may include information identifying how much time has elapsed from the start of an epoch at the relay node when the RTS message signal was received at the relay node. Notably, this timing information is used by the sensor node to re-synchronize the timing of communications between itself and the relay node. This re-synchronization feature will become more evident as the discussion progresses.

Referring again to FIG. 5A, the method 500 continues with step 518. In step 518, the relay node transmits a signal including the CTS message to the sensor node. Subsequently, step 520 is performed where the sensor node receives the signal. Thereafter, the method 500 continues with step 522 of FIG. 5B.

Referring now to step 522 of FIG. 5B, the sensor node generates a signal including an intruder alarm message (or any other message) and transmits the signal to the relay node. Thereafter, step 524 is performed where the sensor node performs actions to process the CTS message for obtaining timing information therefrom. In step 526, the sensor node can update a network table using the timing information. In step 528, the sensor node performs actions to determine a local time increment that corresponds to a time when the relay node's receiver is activated. In the embodiment of the invention described herein, the relay node's receiver is activated for a period of time beginning at time zero (T=0) of the relay node. Accordingly, the sensor node must select a transmit time that coincides with this receiver activation time. This transmit time is determined by calculating a time offset. The time offset is determined by calculating a time difference between the local time increment identified in step 528 and the time zero (T=0) of the relay node. This calculation will be described below in relation to FIG. 6. However, it should be understood that this calculation is similar to the calculation performed in step 228 of FIG. 2B. After step 530, the method 500 continues with step 532. In step 532, the sensor node performs actions to update a time offset table using the computed time offset. Thereafter, step 534 is performed where the method 500 returns to step 504 of FIG. 5A.

Figure 6A:
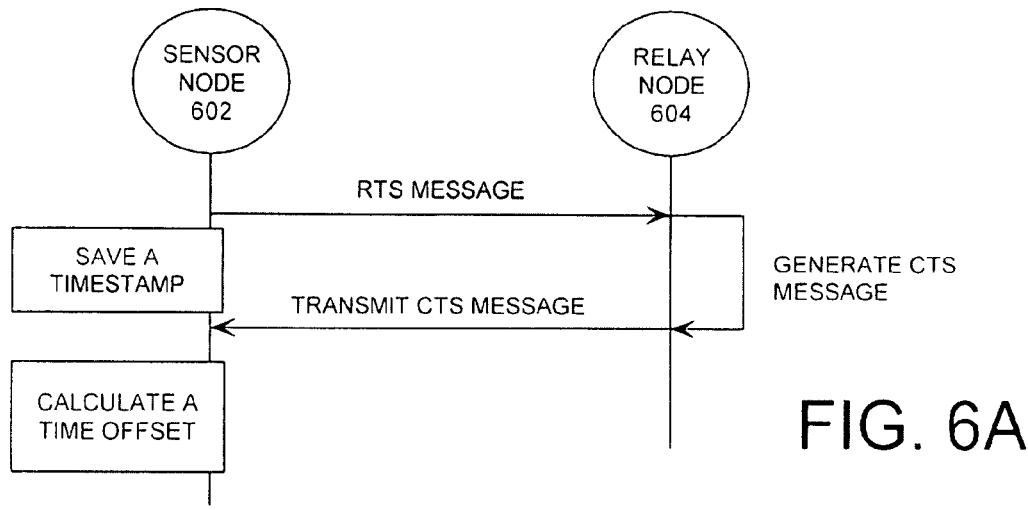
FIG. 6A is a sequence diagram for a communication between a first and second node that is useful for understanding the invention.

Referring now to FIG. 6A, there is provided a state diagram of communication between two nodes that is useful for understanding the time offset computations performed in step 530 of FIG. 5B. A timing diagram that is useful for understanding the time offset computations performed in step 530 is provided in FIG. 6B. The timing diagram shows the timing of join messages transmitted from the first node 302 and received at the second node 304.

Figure 6B:
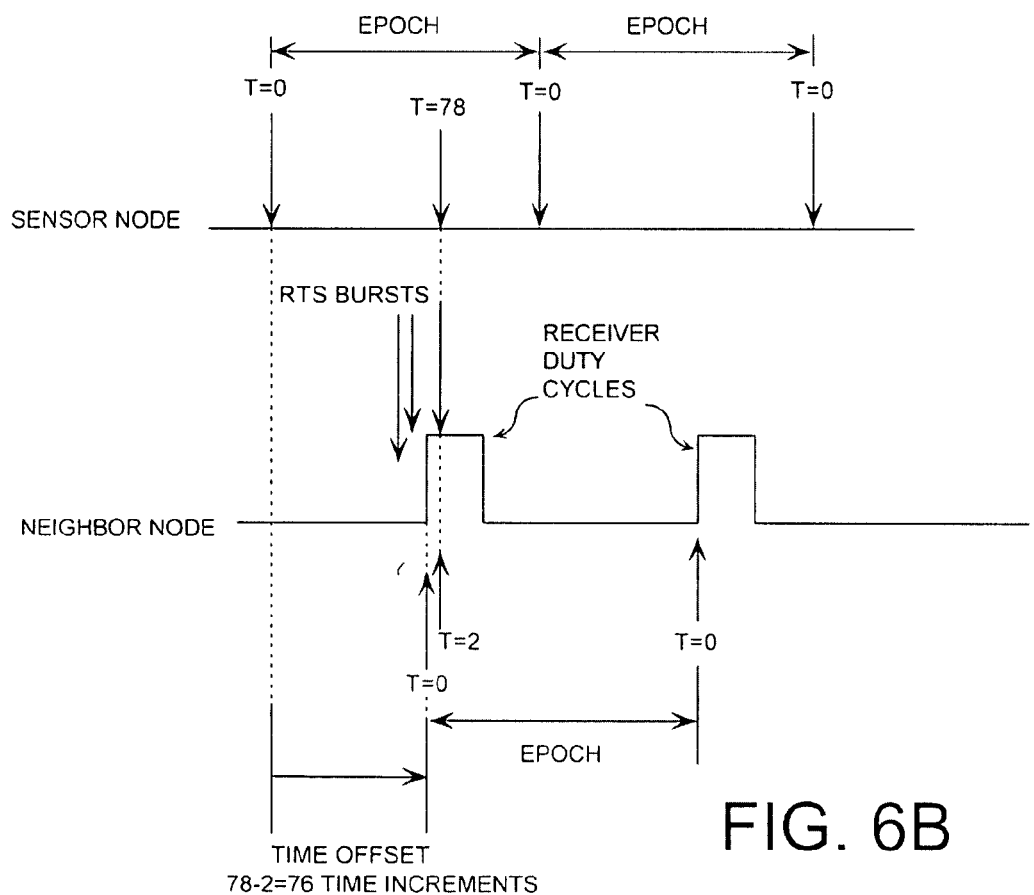
FIG. 6B is a conceptual diagram illustrating a calculation performed in step 528 of FIG. 5B that is useful for understanding the invention.

In the embodiment shown in FIGS. 6A-6B, the sensor node 602 is configured to periodically transmit RTS messages to the relay node 604 during at least one epoch. According to an embodiment of the invention, the sensor node 602 periodically transmits RTS messages to the relay node 604 during each time increment of two (2) epochs. This transmission time configuration ensures that an overlap will occur between the sensor node's 602 epoch and the relay node's 604 duty cycle (or epoch). Still, the invention is not limited in this regard.

The sensor node 602 is also configured to wait a pre-determined period of time between each of the join message transmissions. During this pre-determined period of time, the sensor node's 602 receiver is activated so that the sensor node 602 can receive a join response message transmitted from the relay node 604.

FIGS. 6A-6B will now be described in more detail. As shown in FIGS. 6A-6B, the sensor node 602 transmits a signal including an RTS message via a unicast transmission. Unicast transmissions are well known to those skilled in the art, and therefore will not be described in detail herein. However, it should be understood that a unicast transmission generally involves transmitting an internet protocol (IP) packet to an address of a particular node. It should be noted that the RTS message includes message identification (ID) information, such as a message ID number. This identification information is used by the sensor node 602 to identify the timestamp associated with the RTS message received at the relay node 604. For each RTS message that is transmitted, the sensor node 602 generates a timestamp which identifies a duration of time that has elapsed subsequent to the start of its epoch or time zero (T=0). This timestamp and associated identification information is stored in a memory location of a memory device (not shown) internal to the sensor node 602.

When the relay node 604 receives the signal including the RTS message, it generates a CTS message. The CTS message includes a timestamp. The timestamp represents a duration of time that has elapsed from the start of its epoch (or time zero T=0) up to the time when the CTS message is received at the relay node 604. It should be noted that the CTS message includes the identification information that was contained in the RTS message transmitted from the sensor node 602. Thereafter, the relay node 604 transmits a signal including the CTS message to the sensor node 602.

Subsequent to receiving said signal, the sensor node 602 performs actions to determine which timestamp is associated with the RTS message received at the relay node 604. More particularly, it compares an identification information contained in the CTS message to the identification information associated with Once the timestamp is determined, the sensor node 602 performs actions to calculate a time offset from the start of its epoch (or time zero T=0) to the start of the relay node's 604 epoch (or time zero T=0). For example, if the sensor node 602 timestamp has a value of seventy-eight (78) and the CTS message includes a timestamp of fourteen (14), then the time offset is computed as follows: 78-2=76 time increments. The computed time offset indicates that there are seventy-six (76) time increments between the start of the epoch of the sensor node 602 and the start of the epoch for the relay node 604. Notably the start of the epoch for the relay node also corresponds to the beginning of the time period during which the receiver is activated at the relay node 604.

Figure 7:
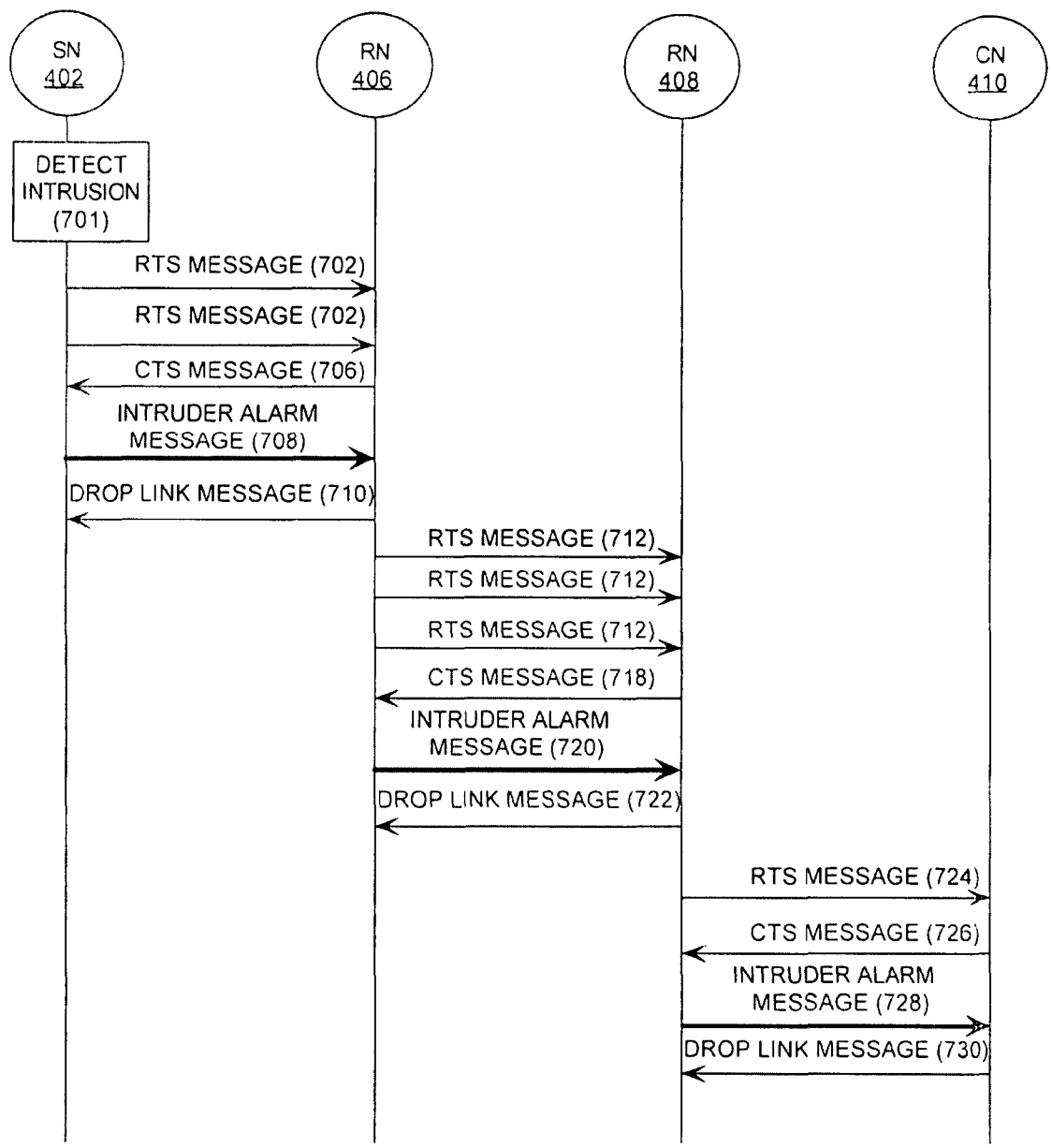
FIG. 7 is a sequence diagram for a communication of an intruder alarm message between nodes of a wireless network, where the nodes implement the method of FIGS. 5A-5B.

Referring now to FIG. 7, there is provided a sequence diagram for a communication of an intruder alarm message between nodes of a wireless network, where the nodes implement the method 500 (described above in relation to FIGS. 5A-5B). As shown in FIG. 7, the sensor node 402 detects an intrusion 701. Thereafter, the sensor node 402 generates an RTS message 702 and periodically communicates the same to the relay node 406 during a pre-defined period of time. Upon receipt of the RTS message (702), the relay node 406 generates a CTS message 706 and communicates the same to the sensor node 402. As a consequence of receiving the CTS message, the sensor node 402 generates an intruder alarm message 708. Subsequently, the sensor node 402 communicates the intruder alarm message 708 to the relay node 406. In turn, the relay node 406 communicates a drop link message 710 to the sensor node 402. Drop link messages are well known to persons skilled in the art, and therefore will not be described in detail herein. However, it should be appreciated that the drop link message is provided to ensure that the communications link between the sensor node 402 and the relay node 406 is timely terminated. Upon termination of the communication link, other nodes can transmit communications to the relay node 406.

After communicating drop link message 710 to the sensor node 402, the relay node 406 periodically transmits a signal including an RTS message 712 to the relay node 408 during a pre-defined period of time. Upon receipt of the RTS message 712, the relay node 408 performs actions to communicate a CTS message 718 to the relay node 406. In turn, the relay node 406 performs actions to communicate an intruder alarm message 720 to the relay 408. Once the intruder alarm message 720 is received at the relay node 408, the relay node 408 performs actions to communicate a drop link message 722 to the relay node 406.

Subsequently, the relay node 408 performs actions to periodically transmit a signal including an RTS message 724 to the central node 410 during a pre-defined period of time. Upon receipt of an RTS message 724, the central node 410 performs actions to communicate a CTS message 726 to the relay node 408. After receiving the CTS message 726, the relay node 408 communicates an intruder alarm message 728 to the central node 410. In turn, the central node 410 communicates a drop link message 730 to the relay node 408.

In light of the forgoing description of the invention, it should be recognized that the present invention can be realized in hardware, software, or a combination of hardware and software. A method for decoding an encoded sequence according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for synchronizing a wireless network, comprising:
   defining a first epoch at a first node to include a first continually repeated timing cycle at said first node;
   defining a second epoch at a second node to include a second continually repeated timing cycle at said second node;
   broadcasting a first signal including a join message from said first node;
   generating a first timestamp value representing a duration of time between a beginning of said first epoch and a time when said first signal including said join message is broadcasted;
   saving said first timestamp in a memory device internal to said first node;
   generating at said second node a second signal including a join response message after receiving said first signal, said join response message comprising a second timestamp selected to be a value representing a duration of time between a beginning of said second epoch and a time when said first signal is received at said second node;
   determining an initial time offset by computing a difference between said first timestamp and said second timestamp;
   using said initial time offset, exclusive of any additional timing information received from said second node, to determine a time period associated with an active portion of a receiver duty cycle at said second node, and to synchronize a timing of a subsequent communication between said first node and said second node; and
   selectively transmitting said subsequent communication from said first node to said second node exclusively during said active portion of said receiver duty cycle;
   wherein said active portion of a receiver duty cycle begins at a time determined by the beginning of said first epoch at said first node, plus an increment defined by said initial time offset.

2. The method according to claim 1, further comprising operating said first node and said second node so that said first epoch and said second epoch are asynchronous.

3. The method according to claim 1, wherein said time offset represents a difference in a start time of said first epoch and said second epoch.

4. The method according to claim 1, further comprising selectively activating an RF receiver in at least said second node in accordance with a predetermined duty cycle to cause said RF receiver activation during a period of time that is less than a duration of said second epoch.

5. The method according to claim 4, further comprising generating at least one request to send (RTS) message at said first node to initiate a data communication with said second node, and generating a time stamp when each said RTS message is transmitted to said second node, said time stamp representing a duration of time from a beginning of said first epoch to a time when said RTS message is transmitted.

6. The method according to claim 5, further comprising generating at least one clear to send (CTS) message at said second node to acknowledge said RTS message, said CTS message including a time stamp identifying when said RTS message was received at said second node relative to a beginning of said second epoch.

7. The method according to claim 6, further comprising processing said CTS message at said first node to update said value of said initial time offset to obtain an updated time offset value.

8. The method according to claim 7, further comprising selectively communicating a data message from said first node to said second node exclusively during a time corresponding to said RF receiver predetermined duty cycle.

9. A method for synchronizing a wireless network, comprising:
   defining a first epoch at a first node to include a first continually repeated timing cycle at said first node;
   defining a second epoch at a second node to include a second continually repeated timing cycle at said second node;
   broadcasting a first signal including a join message from said first node;
   generating a first timestamp in a memory device corresponding to a broadcast time of said first signal, said first timestamp selected to be a value representing a duration of time between a beginning of said first epoch and a time when said first signal is broadcasted;
   generating at said second node a second signal including a join response message after receiving said first signal, said join response message comprising a second timestamp selected to be a value representing a duration of time between a beginning of said second epoch and a time when said first signal is received at said second node;
   determining a time offset by computing a difference between said first timestamp and said second timestamp;
   using said time offset at said first node, exclusive of any additional timing information received from said second node, to determine a time period associated with an active portion of an RF receiver duty cycle at said second node, to synchronize a timing of a subsequent communication between said first node and said second node;
   selectively transmitting said subsequent communication from said first node to said second node exclusively during said active portion of said RF receiver duty cycle.

10. The method according to claim 9, further comprising selecting said active portion of said RF receiver duty cycle to be less than an entire duration of said second epoch.

11. The method according to claim 9, further comprising operating said first node and said second node asynchronously so that said first epoch and said second epoch are not synchronized.

12. The method according to claim 9, wherein said time offset represents a difference in a start time of said first epoch and said second epoch.

13. The method according to claim 10, further comprising periodically updating said time offset value.

14. The method according to claim 13, further comprising using a request to send (RTS) message, and a clear to send (CTS) message to update said time offset value.

15. The method according to claim 14, further comprising generating an RTS time stamp for transmission of said RTS message, and a CTS time stamp for receipt of said RTS message.

16. The method according to claim 15, further comprising calculating an updated value of said time offset using said RTS time stamp and said CTS time stamp.

17. The method according to claim 9, wherein said active portion of a receiver duty cycle begins at a time determined by the beginning of said first epoch at said first node, plus an increment defined by said initial time offset.

* * * * *